(12) United States Patent
Nishimura et al.

(10) Patent No.: US 6,481,305 B2
(45) Date of Patent: Nov. 19, 2002

(54) ROLLER SCREW AND ROLLER SCREW ROLLER ARRANGING METHOD

(75) Inventors: Kentarow Nishimura, Tokyo (JP); Shino Kimura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/793,584

(22) Filed: Feb. 27, 2001

(65) Prior Publication Data

US 2001/0017062 A1 Aug. 30, 2001

(30) Foreign Application Priority Data

Feb. 28, 2000 (JP) .................................... 2000-056006

(51) Int. Cl.$^7$ ................................................ F16H 25/22
(52) U.S. Cl. ........................ 74/424.83; 74/424.81; 74/424.84
(58) Field of Search ................. 74/424.81, 424.82, 74/424.83, 424.84, 424.88

(56) References Cited

U.S. PATENT DOCUMENTS 3,055,230 A * 9/1962 Strassberg ............... 74/424.82
3,192,791 A * 7/1965 Greby .................... 74/424.82
5,535,638 A * 7/1996 Willison .................. 74/424.84

FOREIGN PATENT DOCUMENTS

JP   A-11-210858   8/1999
JP   A-11-257455   9/1999

* cited by examiner

Primary Examiner—William C Joyce
(74) Attorney, Agent, or Firm—Morgan, Lewis & Bockius LLP (57) ABSTRACT

In a roller screw, a plurality of rollers 16 interposed between a nut member 14 and a screw shaft 12 are composed of a forward-motion load roller group 17, the rollers 16 of which are arranged in such a manner that the center lines thereof are set at a given angle $\alpha$ with respect to the center line of the screw shaft 12, and backward-motion load roller group 18, the rollers 16 of which are arranged in such a manner that the center lines thereof are set at an angle $\beta$, which is different from the angle $\alpha$, with respect to the center line of the screw shaft 12; and, the forward-motion load roller group 17 and backward-motion load roller group 18 are disposed such that they are separated from each other.

1 Claim, 5 Drawing Sheets

ROLLER SCREW AND ROLLER SCREW ROLLER ARRANGING METHOD

BACKGROUND OF THE INVENTION

1. Field of the Invention

The present invention relates a roller screw which comprises a screw shaft, a nut member, and a plurality of rollers interposed between the screw shaft and nut member.

2. Description of the elated Art

Figure 5:
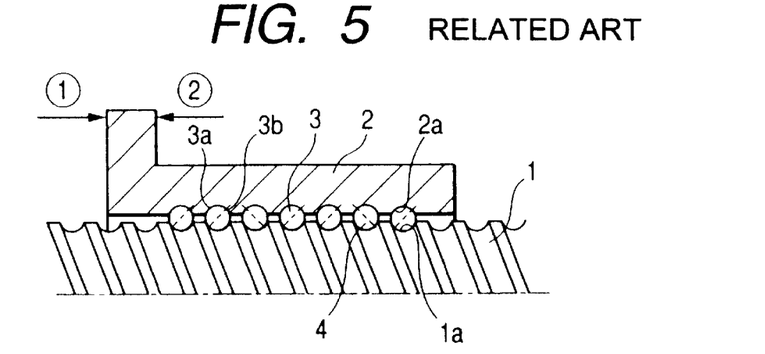
FIG. 5 is a section view of a conventional ball screw in the axial direction thereof.

Conventionally, the e is known a ball screw in which a plurality of balls are interposed between a screw shaft and a nut member. Now, FIG. 5 shows an axial-direction section of a ball screw of this type. In case where a screw shaft 1 is rotated with respect to a nut member 2, the number member 2 is allowed to reciprocate in the axial direction of the screw shaft 1. Balls 3 are all wed to roll between the screw shaft 1 and nut member 2 along the outer periphery of the screw shaft 1. By the way, the ball screw, in some cases, can be given an axial-direction load (1) or an axial-direction load (2) as an external load. The axial-direction load (1) is an external load which occurs when the nut member 2 moves forward, whereas the axial-direction load (2) is an external load which occurs when the number 2 moves backward. These two axial-direction loads (1) and (2) are directed in the mutually opposite directions. As shown in FIG. 5, the right and left half sections of each ball 3 are symmetric in the axial-direction section thereof and, therefore, either of the left and right surface 3a or 3b of the ball 2 is able t receive the load. That is, the ball screw is able to receive both of the axial-direction load (1) and (2) which occur in he reciprocating motion thereof.

In some of the ball crews, there can be a case where there is a great difference in size between the two axial-direction loads (1) and (2). For example, in case where the ball screw is used in an injection molding machine, when fluidized resin is pushed into a metal mod using a push-in device, dozens of tons of axial-direction load is applied to the ball screw, whereas, when the push-in device itself is moved back, only a slight axial-direction load is a plied to the ball screw.

Conventionally, as a all screw suitable for the case where the above-mentioned axial-direction loads occurring in the forward and backward are different in size, as shown in FIG. 5, there is known a ball crew (see JP-A-11-257455) in which not only a portion of a 5 spiral-shaped load rolling groove 2a formed in the nut member 2 is shifted with respect to a spiral-shaped load rolling groove 1a formed in the screw shaft 1 but also the number of effective windings of the load rolling groove 2a for receiving a high load is set larger than the number of effective windings of the load rolling groove 2a for receiving a low load. According to this ball screw, a contact angle line 4, which is obtained by connecting together two contact points, that is, a contact point between the ball 3 and the ball rolling groove 1a formed in the screw shaft 1 and a contact point between the ball 3 and the ball rolling groove 2a formed in the nut member 2, can be incline to thereby receive the two different forward and backward axial-direction loads (1) and (2) applied to the ball screw during the reciprocating motion thereof.

Also, in case of a roller screw in which rollers are interposed between a nut member and as screw shaft, the nut member reciprocates with respect to the screw haft in the axial direction thereof; and, therefore, the roll r screw is requested to be able to receive not only an axial-direction load occurring in the forward motion thereof but also a axial-direction load occurring in the backward motion thereof. However, each of the rollers, unlike the ball, is not formed symmetric (that is, it is not spherical in shape). There ore, in the case of the roller screw, unlike the ball screw, the direction of the axial-direction load that can be received by the roller screw is limited to one direction; and thus, the roller screw is not be able to receive both of the axial direction loads that respectively occur in the forward and backward motion of the roller screw. Even in case where, as di closed in JP-A-257455, a portion of a load rolling groove formed in the nut member is shifted with respect to a roller rolling groove formed in the screw shaft, the roller screw can not receive both of the axial-direction loads respectively occurring in the forward and backward motion of the roller screw.

Figure 6:
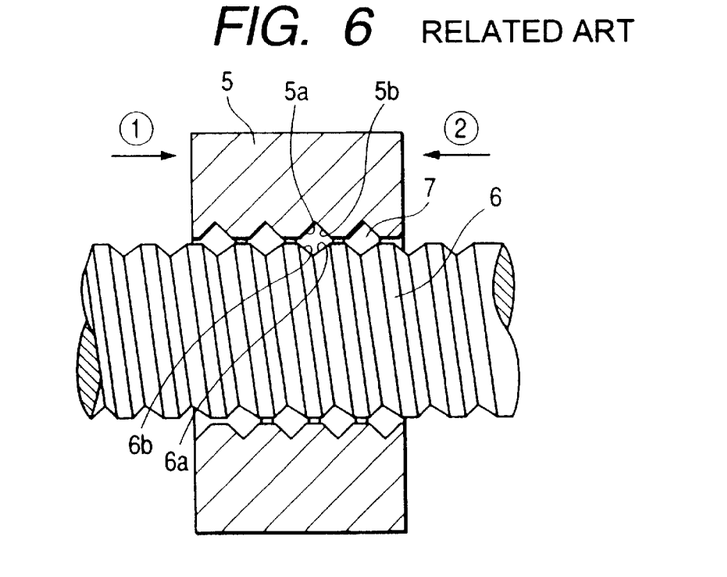
FIG. 6 is a section view of a conventional roller screw in the axial direction thereof.
Figure 7:
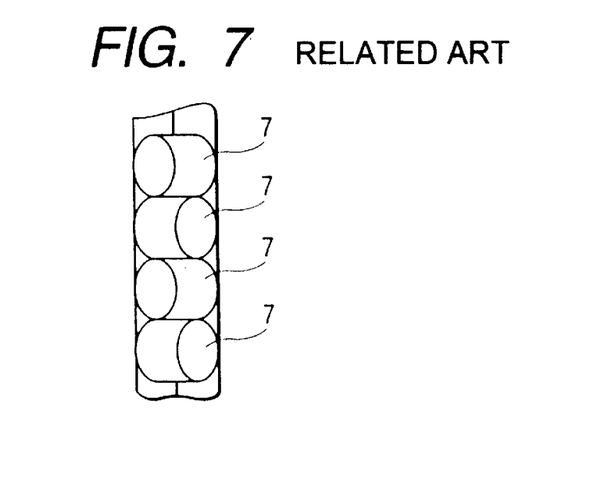
FIG. 7 is a view of rollers to be arranged in a roller rolling passage formed in the conventional roller screw.

As a roller screw which is structured such that it is able to receive both of the axial-direction loads respectively occurring in the forward and backward motion thereof, there is known a roller screw which is disclosed in JP-A-210858. FIG. 6 shows an axial-direction section view of this roller screw, and FIG. 7 shows rollers which are arranged and stored in a roller rolling groove formed in the roller screw shown in FIG. 6. As shown in FIGS. 6 and 7, between a V-shaped load rolling groove formed in a nut member 5 and a V-shaped load rolling groove formed in a crew shaft 6, there are cross arranged rollers 7; that is, the mutually adjoining rollers 7 cross each other. More specifically, the roller 7, which rolls between the wall surface 5a of the load rolling groove and the wall surface 6a of the load rolling groove, and the roller 7, which rolls between the wall surface 6a of the load rolling groove and the wall surface 6b of he load rolling groove, are arranged alternately.

However, in the roller crew of this type, since the mutually adjoining rollers 7 cross each other, when the axial-direction load (1) or the axial-direction load (2) is applied to the roller screw, the rolling roller and the roller 7, which does not roll but slides, are arranged alternately. In this alternate arrangement of rollers, there is a fear that the rolling motion of the rollers 7 or the pick-up operation of the rollers 7 can be interfered. Also, to be able to pick up the mutually crossing rollers 7 with a single return pipe, the section shape of a no-load return passage within the return pipe and the side surface shapes of the rollers must be square, which limits the shape of the return pipe or the shapes of the rollers that can be used. Further, since the number of rollers 7 for receiving the axial-direction load (1) occurring in the forward motion of the roller screw is set equal to that of rollers 7 for receiving the axial-direction load (2) occurring in the backward motion, when the axial-direction load (1) in the forward motion and the axial-direction load (2) in the backward motion are different in size, a roller screw must be selected according to the higher one of the two loads, which makes it inevitable that the whole length of the nut member is long.

SUMMARY OF THE INVENTION

The present invention aims at eliminating the drawbacks found in the above-mentioned conventional roller screws. Accordingly, it is an object of the invention to provide a roller screw and a method for arranging rollers in a roller screw, which not only can receive both of the forward- and backward-motion axial direction external loads but also can prevent the circulatory motion of rollers from being interfered.

Incidentally, in the following description, for the purpose of easy understanding of the invention, the reference numerals of the accompanying drawings are given in parentheses. However, it should be noted here that the invention is not limited to embodiments illustrated herein.

In attaining the above object, according to a first aspect of the invention, a plurality of rollers to be interposed between a nut member and a screw shaft are composed of a forward-motion load roller group the rollers of which are arranged in such a manner that the center lines thereof are set at a given angle with respect to the center line of the screw shaft, and a backward-motion load roller group the rollers of which are arranged in such a manner that the center lines thereof are set at an angle, which is different from the above-mentioned given angle, with respect to the center line of the screw shaft; and, the forward-motion load roller group and backward-motion load roller group are disposed such that they are separated from each other.

That is, according to the first aspect of the invention, the above-mentioned problems can be solved by providing a roller screw which comprises: a screw shaft (12) having a spiral-shaped roller rolling groove (11) formed in the outer peripheral surface thereof; a nut member (14) having a spiral-shaped load rolling groove (13) so formed in the inner peripheral surface thereof as to correspond to spiral-shaped roller rolling groove (11), and a plurality of rollers (16) to be arranged and stored between the roller rolling groove (11) and load rolling groove (13), wherein, as the screw shaft (12) is rotated with respect to the nut member (14), the nut member (14) is allowed to reciprocate with respect to the screw shaft (12), characterized in that the plurality of rollers (16) are composed of a forward-motion load roller group (17) the rollers (16) of which are arranged in such a manner that to center lines thereof are set at a given angle (α) with respect to the center line of the screw shaft (12), and a backward-motion load roller group (18) the rollers (16) of which are arranged in such a manner that the center lines thereof are set at an angle (β), which is different from the above-mentioned given angle, with respect to the center line of the screw shaft (12 ; and, the forward-motion load roller group (17) and backward-motion load roller group (18) are disposed such that they are separated from each other.

According to the first aspect of the invention, since the forward-motion load roller group (17) receives a forward-motion axial-direction load ((1)) applied to the roller screw during the reciprocating motion of the roller screw and backward-motion load roller group (18) receives a backward-motion axial-direction load ((2)) applied to the roller screw during the reciprocating motion of the roller screw, the roller screw is able to receive both of the forward- and backward-motion axial-direction loads. Also, not only because the forward-motion load roller group (17) and backward-motion load roller group (18) are separated from each other but also because the mutually adjoining rollers (16) of the forward-motion load roller group (17) and backward-motion load roller group (18) face in the same direction, there is eliminated a fear that the rolling motion of the rollers (16) with in the load rolling passage (15) as well as the picking-up operation of the rollers (16) by the return pipes (20, 21) can be interfered, thereby allowing the rollers (16) to circulate smoothly.

Also, according to second aspect of the invention, in a roller screw according to the first aspect of the invention, the winding numbers of the forward-motion load roller group (17) and backward-motion load roller group (18) are so set as to be different from each other according to the ratio of axial-direction loads applied to the roller screw during the reciprocating motion there of. Here, the ratio of loads means a ratio of the size of an axial-direction external load ((1)) occurring in the forward motion of the roller screw to the size of an axial-direction external load ((2)) occurring in the backward motion of the roller screw.

According to the second aspect of the invention, in accordance with the ratio of the axial-direction loads applied to the roller screw, the wending number of the roller group which receives a high load can be increased and the winding number of the roller group which receives a low load can be decreased, which makes it possible to minimize the whole length of the nut member (14).

According to a third aspect of the invention, in solving the above-mentioned problems, there is provided a roller screw which comprises: a screw shaft (42) having a spiral-shaped roller rolling groove (41) formed in the outer peripheral surface thereof; a nut member having a spiral-shaped load rolling groove so formed in the inner peripheral surface thereof as to correspond to spiral-shaped roller rolling groove (41), and a plurality of rollers (43) to be arranged and stored in a load rolling passage (44) formed between the roller rolling groove (41) and load rolling groove, wherein, as the screw shaft (42) is rotated with respect to the nut member, the nut member is allowed to reciprocate with respect to the screw shaft (42), characterized in that the number of forward-motion load rollers (43b) arranged such that the center line (46) of the rollers (43b) are set at a given angle (δ) with respect to the center line (47) of the screw shaft (42) and he number of backward-motion load rollers (43a) arranged such that the center lines (45) the rollers (43a) are so set as to cross the center lines (46) of the forward-motion load rollers (43b) are so set as to be different from each other according to the ratio of axial-direction loads applied to the roller screw during the reciprocating motion thereof.

According to the third aspect of the invention, in accordance with the ratio of the axial-direction loads applied to the roller screw during the reciprocating motion thereof, the number of the rollers (43) which receive a high load can be increased and the number of the rollers (43) which receives a low load can be decreased, which takes it possible to minimize the whole length of the nut member.

According to a fourth aspect of the invention, in a roller screw as set forth in any one of the first to third aspects of the invention, the nut member (14) includes return passages (20, 21) for connecting together one end and the other end of a load rolling passage (15) defined by the load rolling groove (13) and roller rolling grove (11), in order to allow the rollers (16) to circulate.

According to the fourth aspect of the invention, since the rollers (16) are alloyed to circulate, the stroke of the nut member (14) with respect to the screw shaft (12) can be increased.

Also, according to a fifth aspect of the invention, there is provided a roller screw roller arranging method for arranging a plurality of rollers (16) between a spiral-shaped roller rolling groove (11) formed in the cuter peripheral surface of a screw shaft (12) and a spiral-shaped load rolling groove (13) so formed in the inner peripheral surface of a nut member (14) as to correspond to the roller rolling groove (11), wherein a forward-motion load roller group (17) is arranged in such a manner that the centers of the rollers (16) are set at a given angle (α) with Respect to the center line of the screw shaft (12), a backward-motion load roller group is arranged in such a manner that the centers of the rollers (16) are set at an angle (β), which is different from the above-mentioned given angle, with respect to the center line of the screw shaft 12), and the forward-motion load roller group (17) and backward-motion load roller group (18) are disposed in such a manner that they are separated from each other.

According to the fifth aspect of the invention, as described above, since the forward motion load roller group (17) receives the forward-motion axial direction load (1) occurring during the reciprocating motion of the roller screw and the backward-motion load roller group (18) receives the backward-motion axial direction load (2) occurring during the reciprocating motion of the roller screw, the roller screw is able to receive both of the forward- and back-ward-motion axial-direction external loads. Also, because the forward-motion load roller group (17) and backward-motion load roller group (18) are separated from each other, the two groups of rollers (16) are allowed to circulate individually, thereby eliminating a fear that the circulating motion of the rollers (16) can be interfered.

BRIEF DESCRIPTION OF THE PREFERRED EMBODIMENTS

DETAILED DESCRIPTION OF THE PREFERRED EMBODIMENTS

Now, a description wile be given in more detail of preferred embodiments of the invention with reference to the accompanying drawings.

Figure 1:
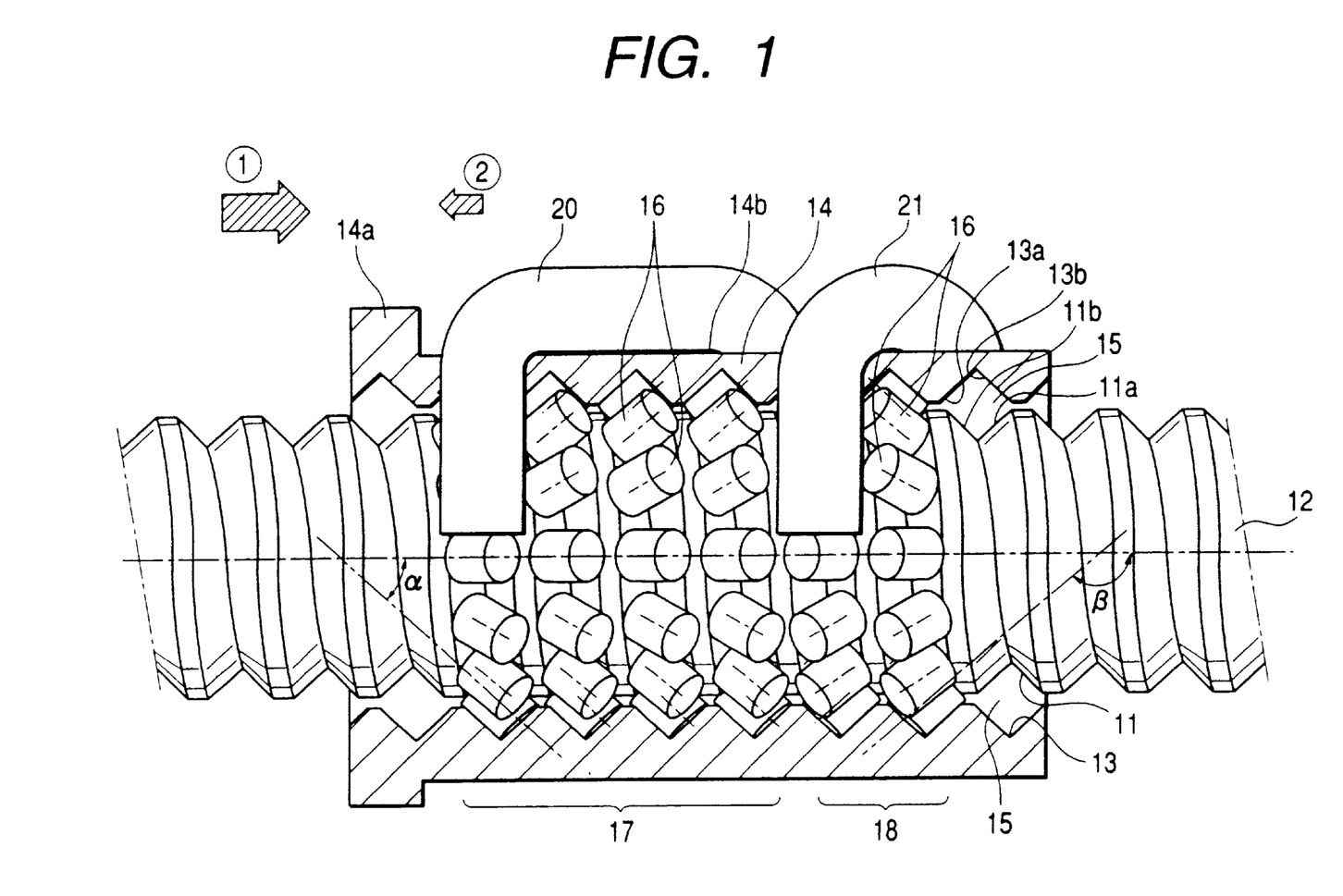
FIG. 1 is a section view showing a roller screw in the axial direction thereof according to a first embodiment of the invention.

Now, FIG. 1 shows a first embodiment of a roller screw according to the invention. This roller screw comprises a screw shaft 12 having a spiral-shaped roller rolling groove 11 formed in the outer peripheral surface thereof, a nut member 14 having a spiral-shaped load rolling groove 13 so formed in the inner peripheral surface thereof as to correspond to spiral-shaped roller rolling groove 11, and assembled to the screw shaft 12, and a plurality of rollers 16 to be arranged and stored in a load rolling passage 15 defined by and between the roller rolling groove 11 and load rolling groove 13. As the screw shaft 12 is rotated with respect to the nut member 14, the rollers 16 are allowed to roll between the roller rolling groove 11 and load rolling groove 13 a d also the nut member 14 is allowed to reciprocate with respect to the screw shaft 12.

In the outer peripheral surface of the screw shaft 12, there is formed a spiral-shaped roller rolling groove 11 having a given lead. This roller rolling groove 11 has a V-shaped section and an angle formed by the inclined wall surfaces 11a and 11b of the roller rolling groove 11 is set at an angle of 90°.

The nut member 14 can be fitted with the screw shaft 12 with a clearance. The nut member 14 is formed in a substantially cylindrical shape and includes a flange 14a to be connected to a member to be guided. In the inner peripheral surface of the nut member 14, there is formed a spiral-shaped load rolling groove 13 having a lead equal to the lead of the screw shaft 12. This load rolling groove 13 also has a V-shaped section and an angle formed by the inclined wall surfaces 13a and 113 of the load rolling groove 13 is also set at an angle of 90°. As a result of this, between the load rolling groove 13 and roller rolling groove 11 which are opposed to each other, there is formed a load rolling passage 15 having a substantially square-shaped section.

Between the load rolling groove 13 of the nut member 14 and the roller rolling groove 11 of the screw shaft 12, there are arranged and stored a Plurality of rollers 16. The plurality of rollers 16 are composed of a group of forward-motion load rollers 17, the center fines of which are arranged at a given angle a with respect to the center line of the screw shaft-12, and a group of backward-motion load rollers 18 the center lines of which are arranged at given angle β, which is different from the above-mentioned given angle α, with respect to the center line of the screw shaft 12. In the present embodiment, the center lines of the rollers of the forward-motion load roller group 17 and the center lines of the rollers of the backward-motion load roller group 18 intersect each other on the section surface of the screw shaft 12 in the axial direction thereof; more specifically, they intersect each other at right angles. The forward-motion load roller group 17 and backward-motion load roller group 18 are arranges such that they are separated from each other. The number of Findings of the forward-motion load roller group 17 is set to be different from the number of windings of the backward-motion load roller group 18 according to the ratio of the axial-direction roads that are applied to the roller screw during the reciprocating motion thereof. When the axial-direction external load (1) (that is, the external load that is applied to the roller screw when the nut member 14 moves to the left in FIG. 1) is larger than the axial-direction external load (2) (that is, the external load that is applied when the nut member 14 moves to the right in FIG. 1), for example, the winding number of the forward-motion load roller group 17 is set at 3.5, while the winding number of the backward-motion load roller group 18 is sit at 1.5. These winding numbers are decided in such a manner that the roller screw are allowed to receive both of the forward-motion and backward-motion axial-direction loads (1) and (2).

Each roller 16 is formed in a cylindrical shape and the shape of the side surface of the roller 16 is square. The roller 16 is allowed to roll between the wall surfaces 11a and 13a which provide the mutually opposing sides of the load rolling passage 15, or between the wall surfaces 11a and 13b which also provide the mutually opposing sides of the load rolling passage 15. The outside diameter of the roller 16 is set almost equal to the distance between the wall surfaces, while the length of the roller 16 is set slightly smaller than the distance between the wall surfaces. In case Where the axial-direction load (1) is applied, the rollers 16 of the forward-motion load roller group 17 are allowed to roll between the wall surfaces 11a and 13a, whereas the rollers 16 of the backward-motion load roller group 18 are allowed to slide between the wall surfaces 11a and 13a. On the other hand, in case where the axial-direction load (2) is applied, the rollers 16 of the backward-motion load roller group 18 are allowed to roll between the wall surfaces lib and 13b, whereas the rollers 16 of the forward-motion load roller group 18 are alloyed to slide between the wall surfaces 11b and 13b. By the way, a pre-load may be applied to the roller 16 or may not. Also, between the rollers 16, to reduce a frictional force between the rollers 16, or to allow the rollers 16 to circulate on a given track, there may be interposed a retainer according to cases.

The nut member 14 includes a plurality of, for example, two return pipes 20 and 21 in correspondence to the forward-motion load roller group 17 and backward-motion load roller group 18. The return pipes 20 and 211 are used to connect one end of the load rolling passage 15 to the other end thereof. In each of the return pipe 20 and 21, there is formed a no-load return passage having a square-shaped section. The return pipe 20 is used to circulate the rollers 16 of the forward-motion load roller group 17, whereas the return pipe 20 is used to circulate the rollers 16 of the backward-motion load roller group 18. Each of the return pipes 20 and 21 is structured such that the two side portions thereof are folded at an angle of 90° with respect to the central portion thereof to thereby form each return pipe in a gate shape. The two leg portions of each return pipe 20 (21) are not parallel to each other but the extending directions thereof are twisted according to the lead angles. In the nut member 14, there is formed a flat surface portion 14b which can be obtained by working a section of the outer peripheral portion of the nut member 14 into a flat surface. In the flat surface portion 14b, there are opened up a plurality of, for example, four return pipe fit holes into which the two sides of the respective return pipes 20 and 21 can be inserted. These return pipe fit hales respectively extend into within the load rolling passage 15. The two sides of the respective return pipes 20 and 21 are inserted into these return pipe fit holes with a clearance of several pitches between them. The return pipes 20 and 21 can be fixed to the nut member 14 by a pipe holder (not shown).

In case where the screw shaft 12 is rotated, the rollers 16 rolling on the load rolling passage 15 are picked up at the leading ends of the return pipes 20 and 21. The picked-up rollers 16 are moved through the no-load return passages formed within the return pipes 20 and 21 and are then returned back again to the load rolling passage 15, specifically the portion of the load rolling passage 15 that is spaced from the leading ends of the return pipes 20 and 21 by a clearance of several pitches. And, the nut member 14 is allowed to move linearly in one direction (that is, in the forward direction) with respect to the screw shaft 12. In case where the screw shaft 12 is reversed, the rollers 16 are caused to circulate reversely along the above passages, whereas the nut member 14 is caused to move linearly in the opposite direction (in the backward direction) By the way, alternatively, the screw shaft 12 may be fixed and the nut member 14 may be rotated.

As described above, the forward-motion load roller group 17 receives the forward-motion axial-direction load (1) occurring in the reciprocating motion of the roller screw, whereas the backward-motion load roller group 18 receives the backward-motion axial-direction load (2) occurring in the reciprocating motion of the roller screw. Therefore, the roller screw is able to receive both of the forward- and backward-motion axial-direction loads (1) and (2). Also not only because the forward- and backward-motion load roller groups 17 and 18 are separated from each other but also because the mutually adjoining rollers 16 of the forward- and backward-motion load roller groups 17 and 18 face in the same direction, there is no fear that the rolling motion of the rollers 16 within the load rolling passage 15 as well as the pick-up operation of the rollers 15 by the return pipes 20 and 21 can be interfered, whereby the rollers 16 are allowed to circulate smoothly. Further, in case where, according to the ratio of axial-direction loads that are applied to the roller screw during the reciprocating motion thereof, the winding number of the roller group that receives the high load is increased and the winding number of the roller group receiving the low load is decreased, the whole length of the nut member 14 can be minimized.

Generally, in the roller screw, since the contact area between the rollers 16 and roller rolling groove 11 or load rolling groove 13 is large when compared with a ball screw, the roller screw is capable of receiving the high load. The present invention can be used properly especially when a high load is given and She forward- and backward-motion axial-direction loads (1) and (2) are different from each other.

Figure 2:
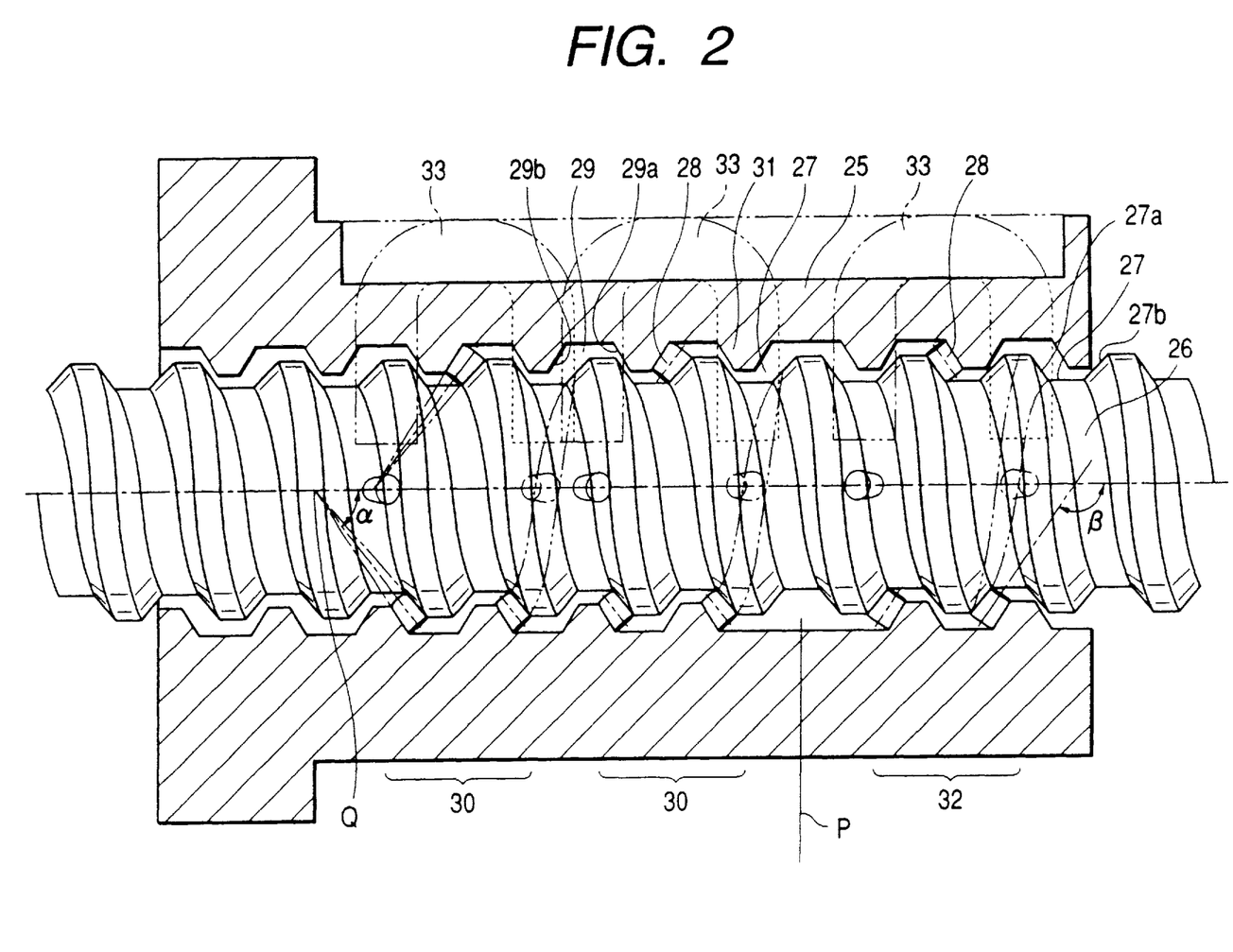
FIG. 2 is a section view showing a roller screw in the axial direction thereof according to a second embodiment of the invention.

Now, FIG. 2 shows a second embodiment of a roller screw according to the invention. In the present roller screw, unlike the roller screw according o the first embodiment of the invention, a nut member 25 is inserted into a roller rolling groove 27 formed in a screw shaft 26. That is, the projecting portion 31 of the nut member 25, in which a load rolling groove 29 is to be formed, is inserted into the ball rolling groove 27 and thus the inside diameter of the nut member 25 is smaller than the outside diameter of the screw shaft 26.

The spiral-shaped roller rolling groove 27, which is formed in the outer peripheral surface of the screw shaft 26, has a given lead and has a trapezoidal-shaped section. Rollers 28 are allowed to roll on they wall surface 27a or wall surface 27b of the roller rolling groove 27.

The spiral-shaped load rolling groove 29, which is formed in the inner peripheral surface of the nut member 25, has a lead equal to that of the roller rolling groove 27 and has a trapezoidal-shaped section. The rollers 28 are allowed to roll on the wall surface 29a or wall surface 29b of the load rolling groove 29. The load rolling groove 29 of the nut member 25 is shifted in the intermediate portion P of the load rolling groove 29. Due to this, on the left side of the load rolling groove 29 that exists on the left side of the P position in FIG. 2, between the wall surface 27b of the roller rolling groove 27 and the wall surface 20b of the load rolling groove 29, there is formed a space in which the rollers 28 can be arranged; and, on the right side of the load rolling groove 29 that exists on the left side of the P position in FIG. 2, between the wall surface 27a of the roller rolling groove 27 and the wall surface 29a of the load rolling groove 29, there is formed a space in which the rollers 28 can be arranged.

The plurality of rollers 16 are comprised of two kinds of roller groups: that is, two groups 30, 30 of forward-motion load rollers which are arranged in such a manner that the center lines of the rollers 16 are set at a given angle α with respect to the center line of the screw shaft 26; and, a group 32 of backward-motion load rollers which are arranged in such a manner that the center lines of the rollers 16 are set at an angle β, which is different frog the given angle α, with respect to the center line of the strew shaft 26. The forward-motion load roller groups 30, 30 are so disposed as to be separated from the backward-motion load roller group 32. The winding numbers of the forward motion load roller groups 30, 30 and backward-motion load roller group 32 are all set equal, for example, the winding numbers thereof are all set for 1.5. The group numbers of forward-motion load roller groups 30, 30 and backward-motion load roller group 32 are so set to be different from each other according to the ratio of axial-direction loads applied to the roller screw during the reciprocating motion thereof: for example, in case where the forward-motion axial-direction load is larger than the backward-motion axial-direction load, as shown in FIG. 2, the group number of the forward-motion load roller groups 30 is set for 2, whereas the group number of the backward-motion load roller group 32 is set for 1.

In the nut member 25, there are disposed a plurality of (for example, three) return pipes 33 in correspondence to the plurality of roller groups. The section of the no-load return passage of each return pipe 33 is decided according to the shape of its associated roller 28.

As the roller 28, there is used a taper roller which is so formed as to have a tapered shape. The vertex Q of the cone of the taper roller is present on the center line of the screw shaft 26. Due to this, the taper roller is allowed to roll between the load rolling groove 29 and roller rolling groove 27 without sliding.

In the roller screw according to the second embodiment of the invention, the shapes of the sections of the roller rolling groove and load rolling groove are not limited to the V shape, and the shape of the side surface of each roller is not limited to a square shape, either. The shapes of the sections of the roller rolling groove and load rolling groove as well as the shape of the side surface Of each roller can be set freely according to loads and required accuracy.

Figure 3:
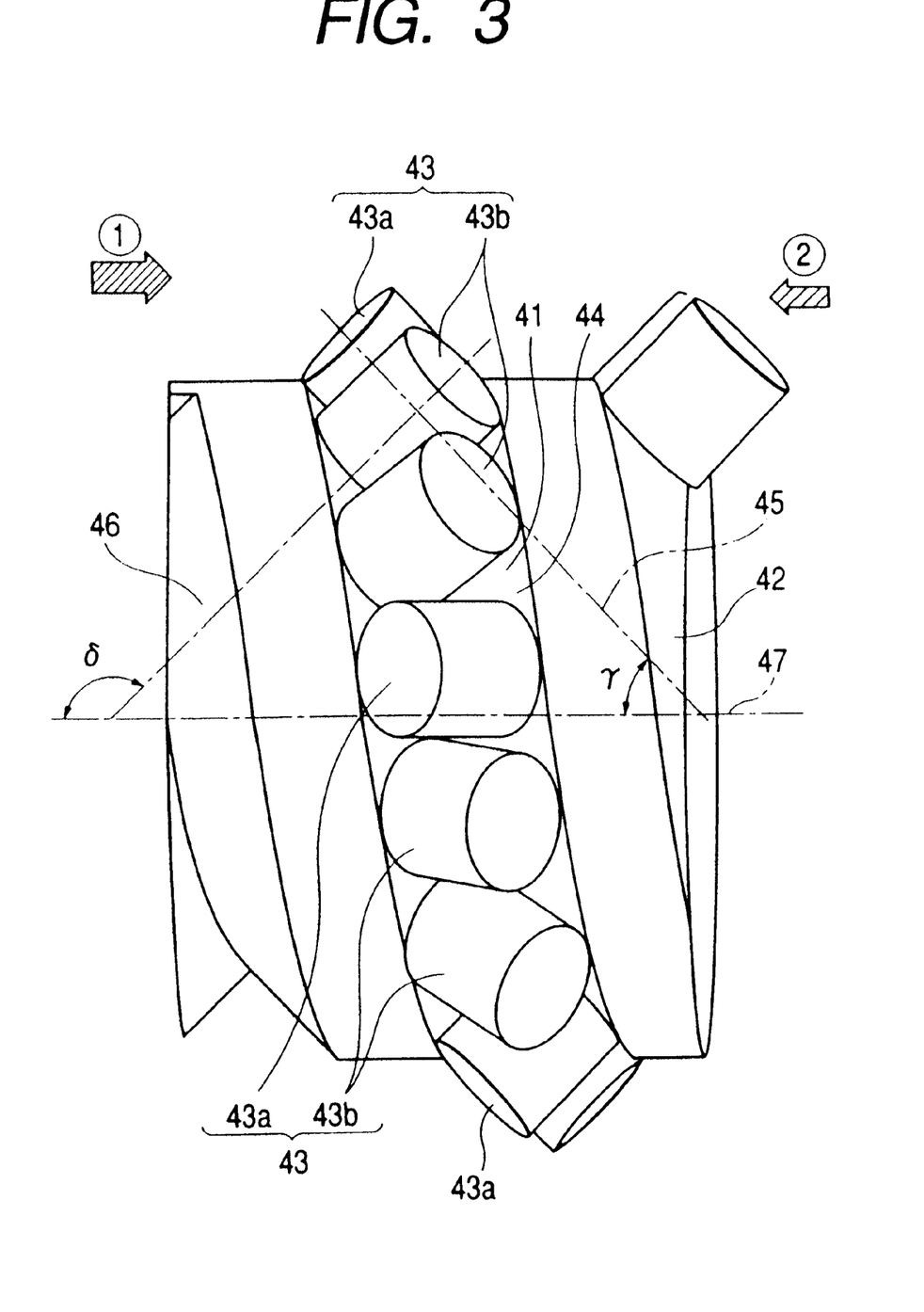
FIG. 3 is a section view showing a roller screw according to a third embodiment of the invention, showing a screw shaft and rollers employed therein.
Figure 4:
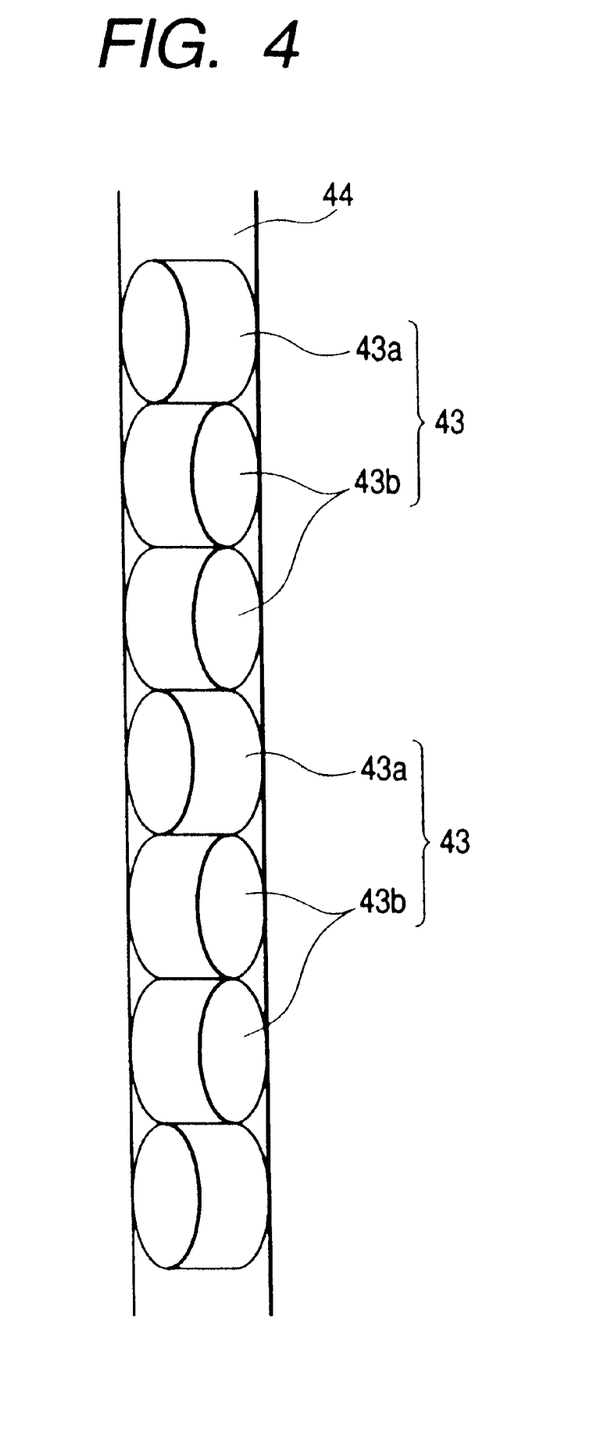
FIG. 4 is a view of rollers to be arranged in a load rolling passage formed in the roller screw according to the third embodiment.

Now, FIGS. 3 and 4 respectively show a third embodiment of a roller screw according to the invention. Specifically, FIG. 3 is a side view of the present roller screw, showing a screw shaft and rollers which are employed therein; and, FIG. 4 shows rollers which are arranged in a load rolling passage formed in the roller screws The present roller screw, similarly to the roller screw according to the previously described first embodiment, comprises: a screw shaft 42 having a spiral-shaped roller rolling groove 41 firmed in the outer peripheral surface thereof; a nut member (not shown) assembled to the screw shaft 42 and having a spiral-shaped load rolling groove so formed in the inner peripheral surface thereof as to correspond to the roller rolling groove; and, a plurality of rollers 43 to be arranged and stored in a load rolling passage which is formed between the roller rolling groove 41 and load rolling groove. In case where the screw shaft 42 is rotated with respect to the nut member, the rollers 43 are allowed to roll between the roller rolling groove 41 and load rolling groove and the nut member is allowed to reciprocate with respect to the screw shaft 42. In the outer peripheral surface of the screw shaft 42, there is formed the roller rolling groove 41 which has a V-shaped section; and, in the inner peripheral surface of the nut member, there is formed the load tolling groove which also has a V-shaped section. Between the lead rolling groove and roller rolling groove 41 which are opposed to each other, there is formed a load rolling passage 44 which has a substantially square-shaped section.

In the present roller screw, unlike the roller screw according to the first embodiment, the rollers 43 are cross arranged in a single load rolling passage 44. That is, in the load rolling passage 44, there are arranged forward-motion load rollers 43b in such a manner that the center lines 46 of the rollers 43b are set at a given angle → with respect to the center line 47 of the screw shaft 42 and, at the same time, there are cross arranged backward-motion load rollers 43a in such a manner that the center lines 45 of the rollers 43a are so set as to cross the center lines 46 of the forward-motion load rollers 43b. The center lines 45 of the rollers 43a and the center line 47 of the screw shaft 42 form an angle γ. The center lines 46 of the forward-motion load rollers 43b and the center lines 45 of the rollers 43a cross each other at right angles.

In the present embodiment, the numbers of the forward-motion load rollers 43b and backward-motion load rollers 43a are set different from each other according to the ratio of the axial-direction loads applied to the roller screw during the reciprocating motion thereof. In case where the axial-direction external load (1) which occurs in the forward motion of the roller screw is larger than the axial-direction external load (2) occurring in the backward motion of the roller screw, the ratio of the number of the forward-motion load rollers 43b to the number of the backward-motion load rollers 43a is set, for example, 2:1. The number of the forward-motion load rollers 43b and the number of the backward-motion load rollers 43a are decided in such a manner that the roller screw is able to receive both of the forward- and backward-motion axial-direction loads (1) and (2). In case where, according to the ratio of the axial-direction loads applied to the roller screw during the reciprocating motion thereof, the number of the rollers 43 receiving the high load is increased and the number of the rollers 43 receiving the low load is decreased in this manner, the whole length of the nut member 14 can be minimized.

By the way, in the case of the present roller screw, the rollers rolling through the load rolling passage are picked up by the return pipes and are returned by a distance equivalent to several winding numbers. However, alternatively, there may be disposed in the nut member a deflector which is used to pick up the rollers. That is, the rollers having been rolling on the roller rolling groove may be removed from the roller rolling groove by the deflector and may be returned beyond the outside diameter portion of the screw shaft to the roller rolling groove one lead ahead. Also, it is also possible to employ a roller screw of a so called side cover type structured such that a nut member is composed of a nut main body with a roller rolling groove formed therein and two side covers respectively mounted on the two ends of the nit main body, there is formed a roller return passage in the nut main body, and, in the two side covers, there are respectively communication passages for communicating the roller rolling groove and roller return passage to each other.

As has been described here to fore, according to the invention, a plurality of rollers are composed of a group of forward-motion load rollers, the center lines of which are arranged at a given angle with respect to the center line of the screw shaft, and a group of backward-motion load rollers the center lines of which are arranged at an angle, which is different from the given angle, with respect to the center line of the screw shaft; and, the forward- and backward-motion load roller groups are disposed such that they a e separated from each other. Since the forward-motion roller group receives a forward-motion axial-direction load applied to the roller screw during the reciprocating motion thereof and the backward-motion load roller group receives a backward-motion axial-direction load applied to the roller screw during the reciprocating motion thereof, the roller screw is able to receive both of the forward- and backward-motion axial-direction loads. Also, because the forward- and backward-motion load roller groups are separated from each other and also because the mutually adjoining rollers of the forward- and backward-motion load roller groups face in the same direction, there is eliminated a fear that the rolling motion of the rollers within the load rolling passage as well as the picking-up operation of the rollers by the return pipes can be interfered, thereby allowing the rollers to circulate smoothly.

What is claimed is:

1. A roller screw comprising:
   a screw shaft having a spiral-shaped roller rolling groove formed in an outer peripheral surface thereof;

a nut member having a spiral shaped load rolling groove formed in an inner peripheral surface thereof so as to correspond to said roller rolling groove; and a plurality of rollers to be arranged and stored between said roller rolling groove and said load rolling groove;

wherein as said screw shaft is rotated with respect to said nut member, said nut member is allowed to reciprocate with respect to said screw shaft;

wherein said plurality of roller$ includes a forward-motion load roller group the rollers of which are arranged in such a manner that the center lines thereof are set at a given angle with respect to the center line of said screw shaft, and a backward-motion load roller group the rollers of which are arranged in such a manner that the center lines thereof are set at an angle, which is different from said angle, with respect to the center line of said screw shaft; and wherein said forward-motion load roller group and said backward-motion load roller group are separated from each other within the nut, and wherein the winding numbers of said forward-motion load roller group and said backward-motion load roller group are set to be different from each other according to the ratio of axial-direction loads applied to said roller screw during the reciprocating motion thereof.

* * * * *